March 31, 1970   C. H. PARSONS ET AL   3,504,346
PERSONNEL INFORMATION REGISTER SYSTEM
Filed May 31, 1967   6 Sheets-Sheet 1
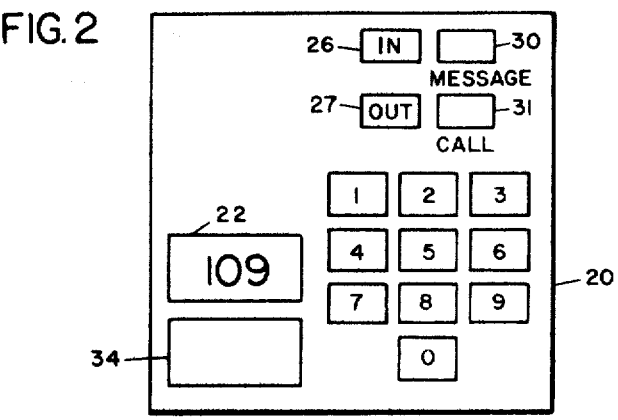
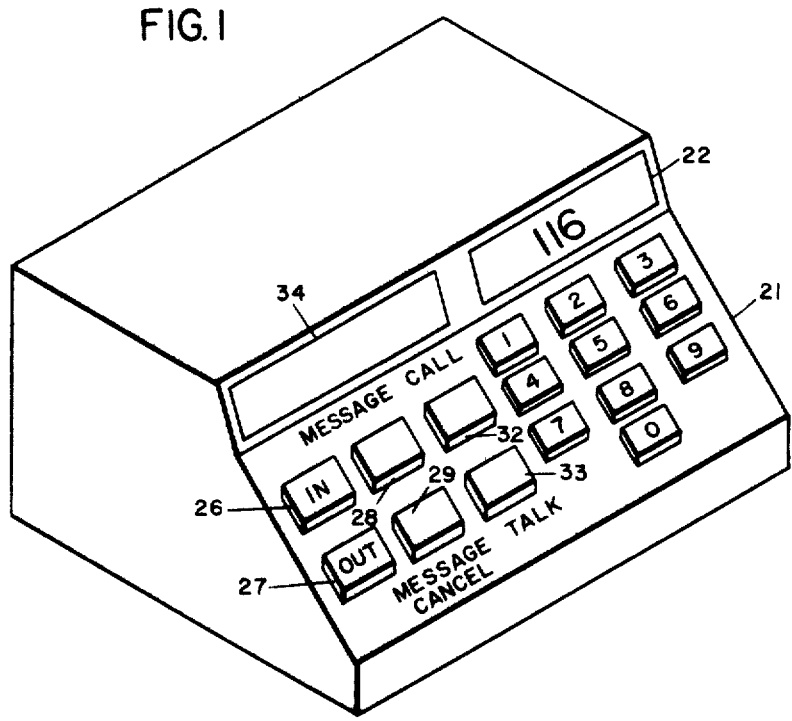
INVENTORS
C.H. PARSONS AND
B.A. KING
BY
THEIR ATTORNEY March 31, 1970    C. H. PARSONS ET AL    3,504,346
PERSONNEL INFORMATION REGISTER SYSTEM
Filed May 31, 1967            6 Sheets-Sheet 2

INVENTORS
C.H. PARSONS AND
B.A. KING
BY
*Forest B. Hitchcock*
THEIR ATTORNEY

INVENTORS
C.H. PARSONS AND
B.A. KING

United States Patent Office 3,504,346
Patented Mar. 31, 1970

3,504,346
PERSONNEL INFORMATION REGISTER SYSTEM
Charles H. Parsons, Stamford, and Bruce A. King, West Redding, Conn., assignors to Edwards Company, Inc., Norwalk, Conn., a corporation of Connecticut
Filed May 31, 1967, Ser. No. 642,563
Int. Cl. G11b *13/00;* G06f *7/00*
U.S. Cl. 340—172.5      12 Claims

ABSTRACT OF THE DISCLOSURE

A distinctive multiple digit decimal number is assigned to each person for which information is to be remembered and manually operable buttons are used to designate the decimal number and to designate personnel information at each of a plurality of stations which also have indicator lamps for manifesting a number designated at that station and information stored relative to the designated personnel number. Each digit of each personnel number designated is converted to a biquinary code which provides for selectively energizing either one or two of six wires connecting the station to a central location, dependent upon whether the decimal number designated is odd or even. A temporary memory at the central location stores the information designated for each person until a station scanning ring counter at the central location enables transfer of the information from the temporary memory for that station to a permanent memory that is common to all stations. Access to the permanent memory for readout is obtained by designating the multiple digit decimal number for the person for which information is desired. Information readout of the permanent memory is manifested, along with the corresponding personnel number, for a predetermined time interval after readout, substantially independent of the rate of scan of the ring counter. Thus it is possible to manifest contemporaneously at different stations information pertinent to different personnel.

BACKGROUND OF THE INVENTION

Personnel information register systems are used, for example, in hospitals for storing and manifesting information at one or more stations as to presence of certain personnel, such as doctors, at the hospital, and as to other information pertinent to the personnel. There is generally a register at each of several entrances to the hospital, and also at a point convenient to an operator, such as a telephone operator. Each register can have a name button, for example, that can be illuminated when operated by a doctor when he enters the hospital, and can be extinguished upon a second actuation of the button when the doctor leaves. An indication that there is a message for the doctor can be manifested by flashing the lamp used for illumination of the button belonging to that doctor when such button has been actuated to indicate the presence of the doctor at the hospital. Buttons and indicating means at each station are generally connected by many control wires, to a central information storage location, at which information can be designated by the actuation of manual control switches relative to the several doctors. This requires a large number of wires connecting each station to the central location, and places a practical limit on the number of names that a register system can accommodate.

Coded systems in which information pertinent to the several doctors can be designated at each of several stations for a memory at a central location, generally require busy signals at the several stations to prevent interference due to two stations requesting information from the central memory at the same time, or duplicate access paths are provided.

SUMMARY OF THE INVENTION

The present invention provides a personnel information register system that both reduces the direct wire connection requirements and permits all stations to use a common permanent memory at a central location contemporaneously. This makes the present system practical for a greater number of names and permits substantially full-time use of the common permanent memory by all stations, thus eliminating the requirement of providing and observing busy signals.

In the system according to the present invention, different multiple digit decimal numbers are assigned to the several persons for which information is to be registered. Means is provided for designating the digits of these numbers by actuation of decimal push buttons for the digits successively. A designated decimal number is converted to a biquinary code and applied, by the selective energization of one or two of six control wires, dependent upon whether the decimal number is odd or even, to the control of temporary memory means at the central location for remembering the code belonging to the personnel number that has been designated. A digit ring counter directs the code, applied over the code control wires connecting a station to the control location, to portions of the temporary memory belonging to the respective digits as the digits of a personnel number are successively designated by actuation of the decimal numbered buttons. The personnel number designated at a particular station is indicated, digit by digit at that station, the number being manifested for a predetermined time interval after designation.

When all of the digits of a personnel number have been designated, information pertinent to that number is read out of the permanent memory at the central location, and this information is indicated at the particular station where the personnel number has been designated, for the duration of a timed interval. If an operator at one of the stations wishes to change the storage of information relative to a particular personnel number that is being manifested on his control panel, this can be accomplished by actuation of information designating buttons on that control panel. Actuation of these buttons conditions a temporary memory, and at an appropriate time, the information in the temporary memory is transferred to the permanent memory. The change in the condition of the permanent memory is indicated on the control panel for the station at which the information has been designated to thus verify that the information designated has been properly registered in the permanent memory.

Access to the permanent memory by the respective stations is rendered effective by a fast scanning means, including a ring counter. The scanning ring counter is stalled momentarily at a stage for a particular station when there is a call by that station for access to the permanent memory for reading out of, or reading into, the permanent memory. Each station has associated therewith a timer which maintains the manifestation of both a designated personnel number and information pertinent to that number for a predetermined time interval much greater than the scan stall interval. This permits the manifestation contemporaneously at different stations of information pertinent to different personel numbers.

An object of the present invention is to provide an improved personnel information register system wherein a plurality of stations can use a common permanent memory, and wherein the stations can contempaneously manifest different information read out of memory.

Another object of the present invention is to provide direct wire facilities between the station and a central location in a personnel information register system by using the selective energization of one or two of six wires, dependent upon whether or not a designated decimal number is odd or even, to transmit a decimal number in the form of a biquinary code.

Other objects, purposes and characteristic features of the present invention will be in part obvious from the accompanying drawings, and in part pointed out as the description of the invention progresses.

In describing the invention in detail, reference is made to the accompanying drawings, wherein corresponding parts are identified by similar reference characters throughout the several figures, and wherein:

FIG. 1 shows in perspective an operator's console such as can be used in connection with at least one of the stations for operation of the system according to one embodiment of the present invention;

FIG. 2 is an elevational view of a control panel that can be used at any one of the other stations in the system according to one embodiment of the present invention;

Figure 3:
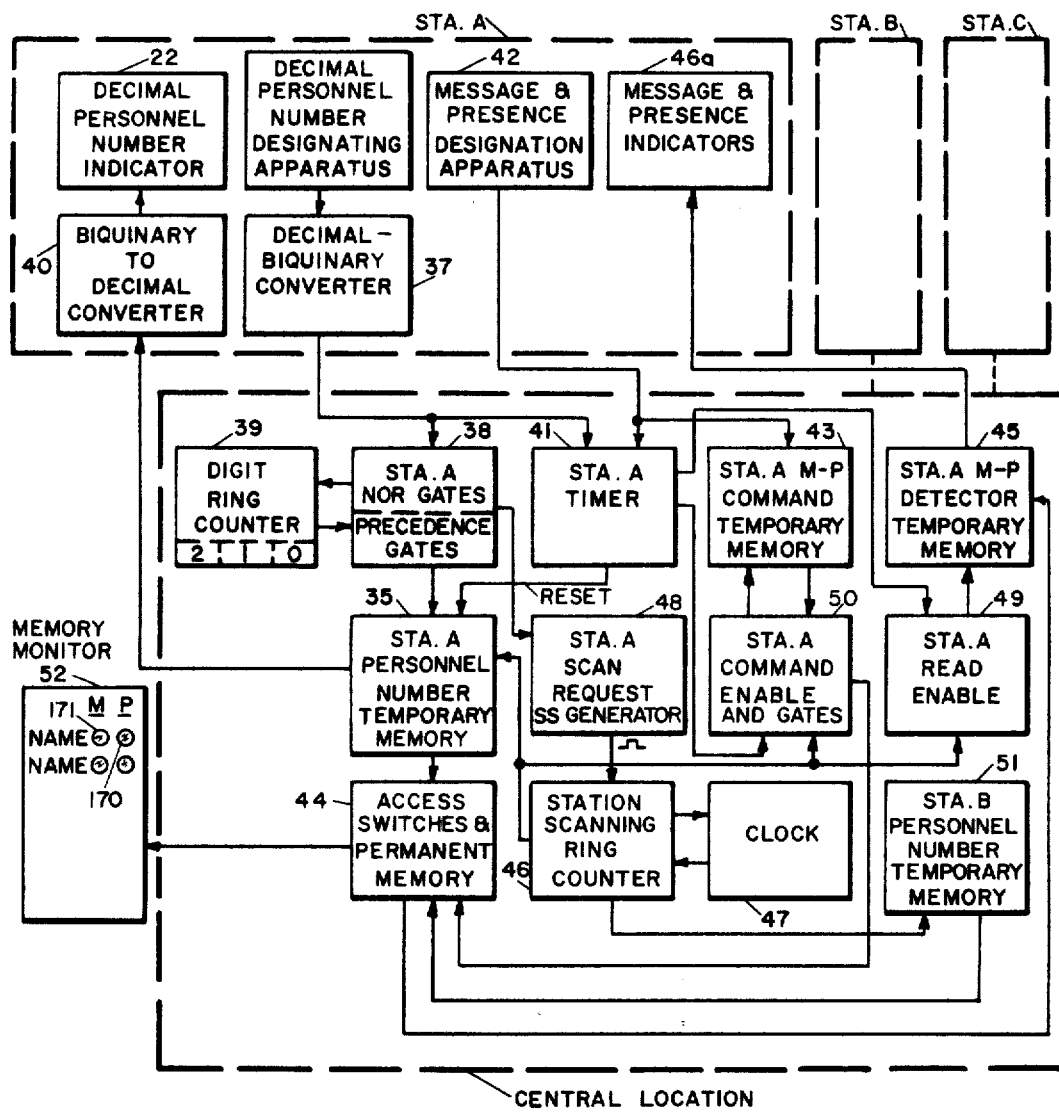
FIG. 3 is a block diagram illustrating the system organization for a personnel register system according to one embodiment of the present invention.
Figure 4A:
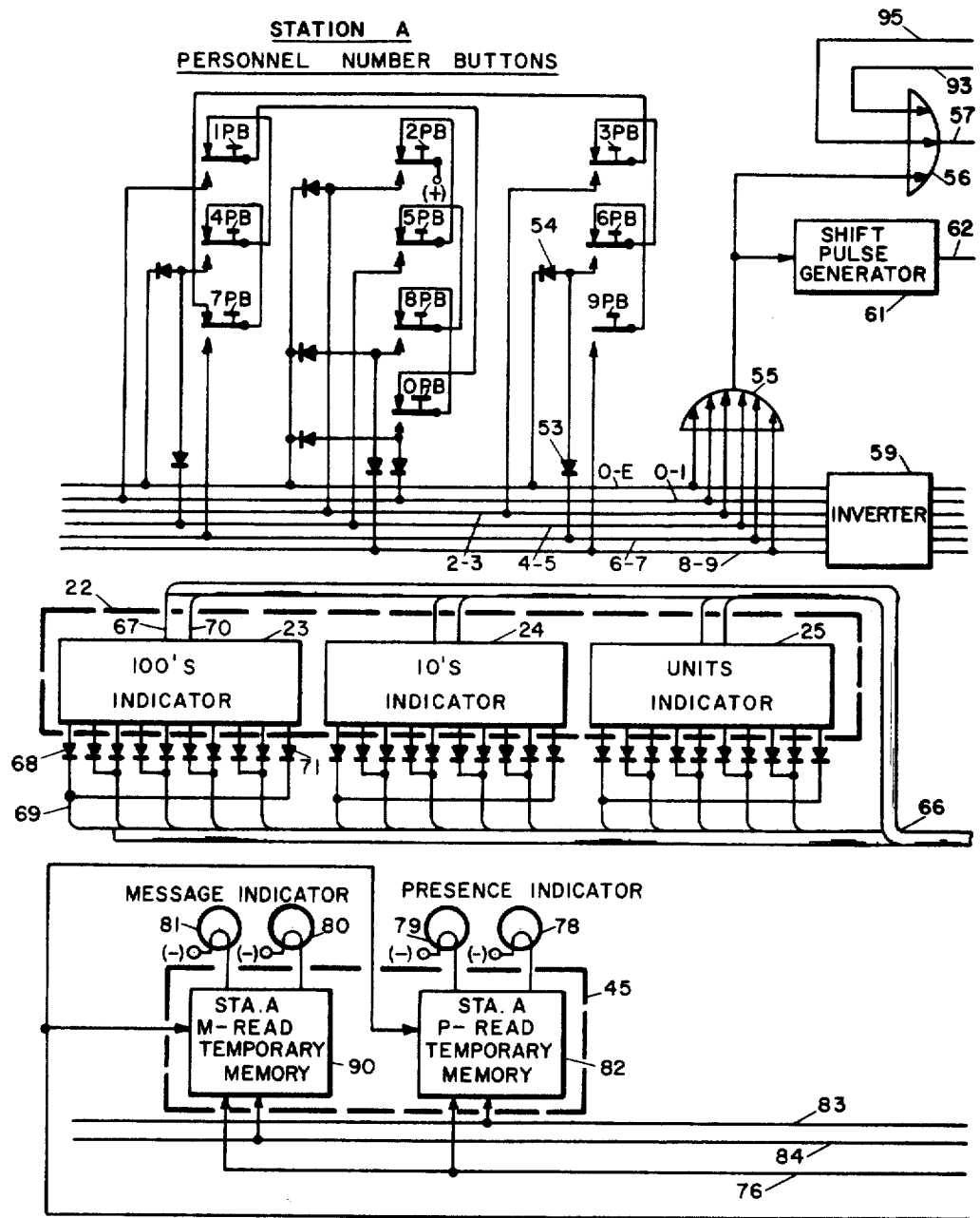
Figure 5B:
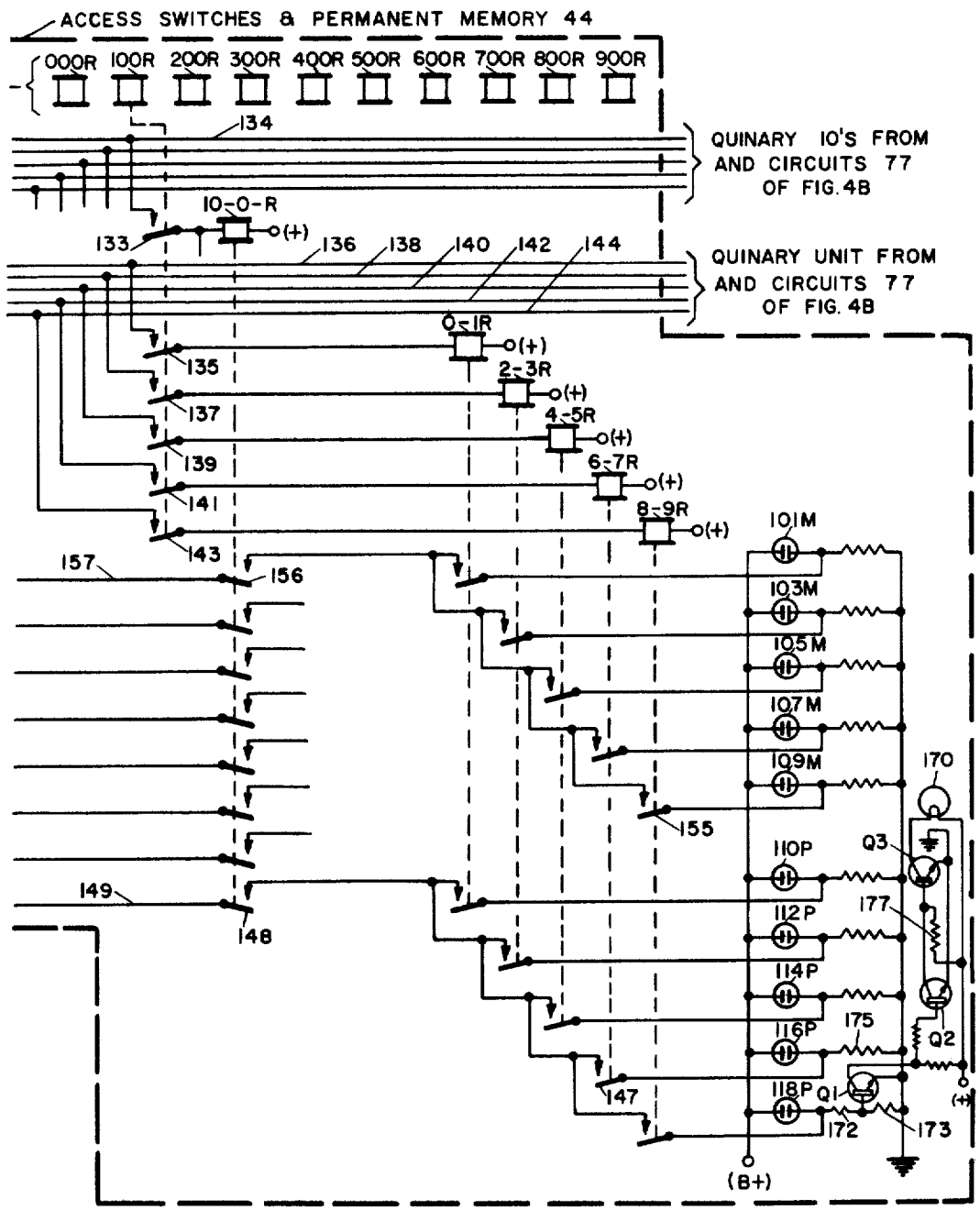
Figure 4B:
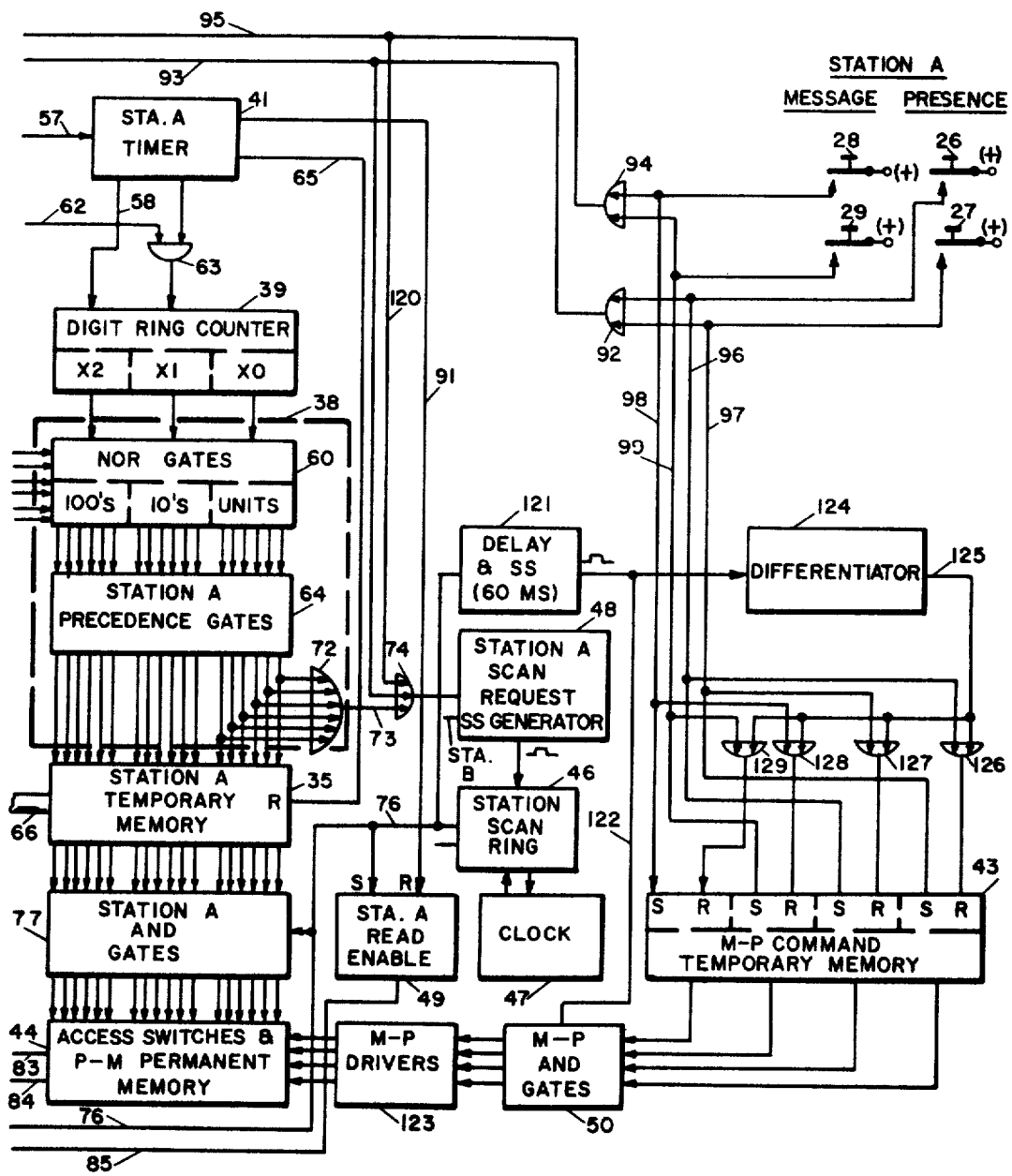
Figure 5A:
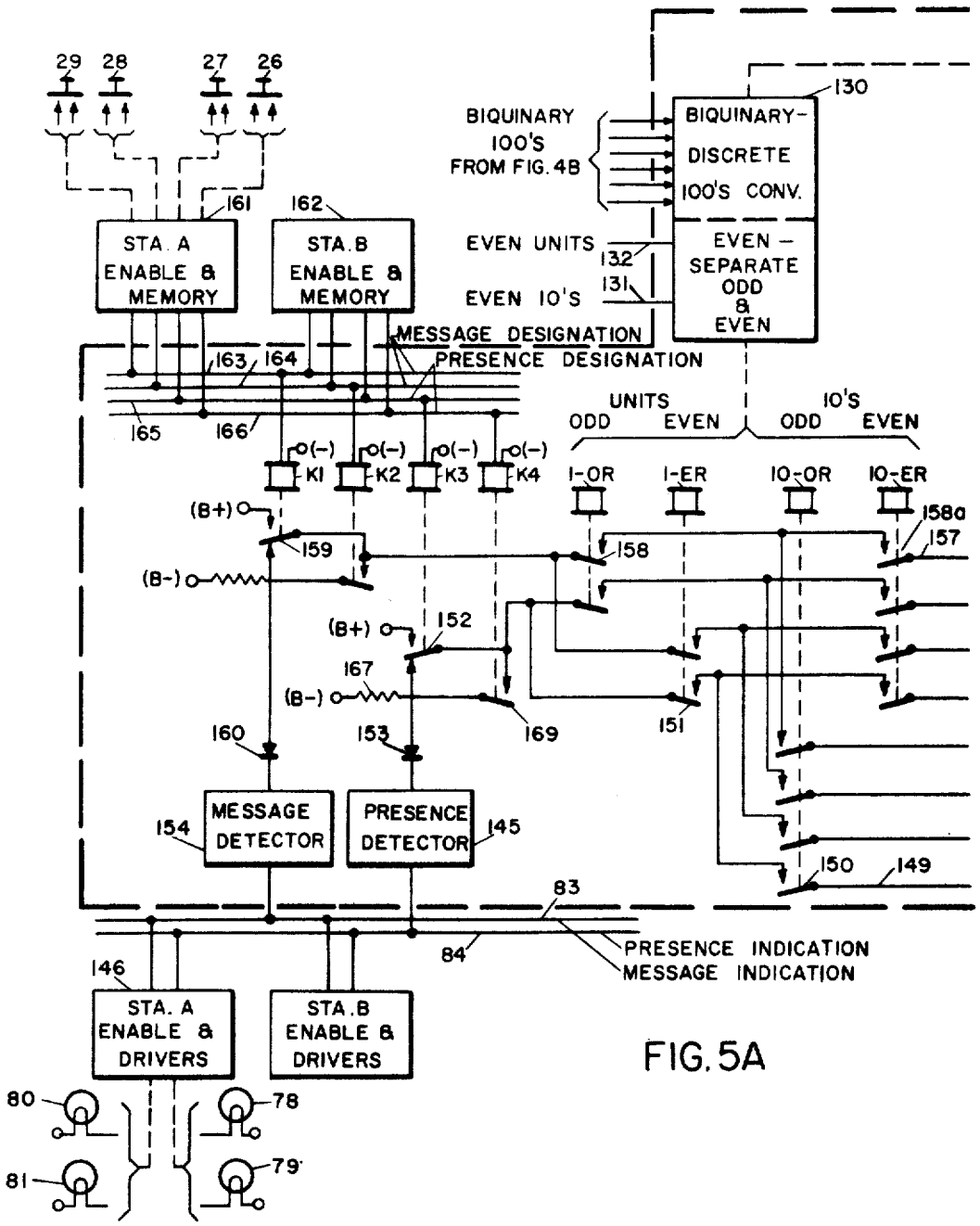

FIGS. 4A and 4B, when placed side by side, illustrate more in detail the system shown by block diagram in FIG. 3; and, FIGS. 5A and 5B, when placed side by side, illustrate circuit logic for a portion of the system shown in FIGS. 4A and 4B.

GENERAL ORGANIZATION

It is contemplated that a control panel 20 such as is shown in FIG. 2 will be located near each entrance to a building, such as a hospital, which will be used by personnel for which the system is provided. It is further contemplated that a console control panel 21 such as is shown in FIG. 1 will be used for at least one station of the system, which can be, for this embodiment, the station that is designated in FIG. 3 as station A. This console may be located on the desk of an operator who will receive messages for personnel such as doctors, for example. Each of the panels 20 and 21 has a set of decimal keys numbered 1-9 and 0 for designation of the decimal numbers successively for the several digits of a multiple digit personnel number. An indicator 22 is provided on each panel to manifest the decimal number that has been designated for each digit by actuation of the keys. For manifesting a three digit number, for example, the indicator 22 has separate units for indication of the respective digits as illustrated in FIG. 4A, wherein unit 23 is provided for manifesting the hundreds digit, unit 24 is provided for manifesting the tens digit and unit 25 is provided for manifesting the units digit.

Each of the control panels 20 and 21 has a combined indicator and push button 26 for respectively manifesting and designating when a doctor is in, and similarly a combined indicator and push button 27 is provided for respectively manifesting and designating when a doctor is out. A combined indicator and push button 28 is provided on the console panel 21 for the purpose of respectively manifesting and designating when there is a message for a doctor. A combined indicator and push button 29 is provided on the console 21 for respectively manifesting and designating cancellation of a storage that there is a message. This button is generally actuated after a message has been given to a doctor. Each of the panels 20 has a message indicator 30 for manifesting when there is a message for a doctor, and it has a call button 31 for actuation by a doctor to call the operator to request information relative to a message that may have been manifested by the illumination of the indicator 30. An indicator 32 on the panel 21 becomes illuminated in response to the actuation of a call button 31 on any of the panels 20. This informs an operator of the console 21 that a message is requested, and by pushing a talk button 33, the operator can give the message to the doctor over an intercom system having a speaker 34 on each of the panels 20 and 21.

With reference to FIG. 3, the system has a personnel number temporary memory at the central location for each station, such as the station A personnel temporary memory 35. This temporary memory is set in accordance with the actuation of decimal personnel number designating apparatus 36 at station A.

A decimal-biquinary converter 37 is provided for converting the decimal designation by actuation of a decimal push button to a biquinary code wherein only one of five wires is selected for energization in accordance with whether the number designated is one or the other of five pairs of different decimal numbers, one number of each pair being an odd number and one number of each pair being an even number. In addition, a sixth wire is selectively energized or deenergized as the binary portion of the code in accordance with whether the number designated is an even or an odd decimal number. These six wires serve as an input to station A NOR gates 38 which govern input to the station A personnel number temporary memory 35. The station A NOR gates 38 are used to channel inputs for the respective digits of the multiple digit number into the station A personnel number temporary memory 35 sequentially, as determined by a digit counter 39. The temporary memory 35 has an output applied through a biquinary-decimal converter 40 to the decimal personnel number indicator 22. Thus the operator is able to see on the indicator 22 manifestation of the respective digits of a multiple digit number which he has designated. A timer is provided for each station for governing the time duration of display of information on the control panel at the associated station. Timer 41 is provided for this purpose relative to the control of apparatus associated with station A.

Message-presence designation apparatus 42 of FIG. 3 corresponds to the buttons 26, 27, 28, and 29 on the console 21 of FIG. 1. This apparatus is used by an operator to designate information to be stored in the permanent memory relative to the respective personnel multiple digit numbers that can be designated by the decimal personnel number designating apparatus 36.

A message-pesence command temporary memory is provided at the central location for each station corresponding to the station A message-presence command temporary memory 43 (see FIGS. 3 and 4B).

A permanent memory and access switches 44 (see FIGS. 3 and 5A and 5B) are provided at the central location for storing presence and message designations for the respective personnel numbers so that the information stored can be read out of the permanent memory by actuation of the access switches in response to an output from the personnel number temporary memory for any station, such as in response to the station A personnel number temporary memory 35. Information read out of the permanent memory is applied to 'a message-presence detector temporary memory, such as the station A message-presence detector temporary memory 45 of FIGS. 3 and 4A. Information stored in the temporary memory 45 governs the selective energization of message-presence indicator apparatus 46a (see FIG. 3), which comprises indicator lamps in the buttons 26-29 (see FIG. 1).

A station scanning ring counter 46 (see FIGS. 3 and 4B) is provided at the central location for scanning all of the stations during each cycle of operation to afford access to the permanent memory 44 for each station in turn. The station scanning ring counter 46 is driven by a clock 47. Each station has a scan request single shot generator, such as the station A scan request single shot generator 48, for the purpose of enabling the associated station access to the permanent memory 44 to read out of the permanent memory or to change the information stored as desired. The single shot generator 48 stops the station scanning ring counter 46 momentarily by stopping the clock 47 when the ring counter reaches a stage corresponding to the associated station. At this time, the station scanning ring counter has an output for station A on wire 76 which sets a station A read enable flip-flop 49 and also sets station A command enable AND gates 50 (see FIG. 3) to permit the permanent memory 44 to be conditioned in accordance with the condition of the command temporary memory 43. The setting of the station read enable 49, together with energization of wire 76, renders the station A M-P detector temporary memory 45 responsive to the permanent memory 44. The input to the station A M-P detector temporary memory 45 from the permanent memory 44 is selected by access switches associated with the permanent memory 44 wherein only information pertinent to the person whose decimal number has been designated by manual designation at station A is read out of the memory 44. In other words, for station A, the station A personnel number temporary memory 35 governs the access switches to read from the memory 44 only information pertinent to the particular multiple digit number that has its biquinary code remembered by the temporary memory 35. Similarly, for each of the other stations, a personnel number temporary memory is provided which governs the reading out from the permanent memory 44 of information designated at the associated station. Thus, for example, the station B personnel number temporary memory 51 (see FIG. 3) is provided for governing operation of access switches of the permanent memory 44 in accordance with designation of a personnel multiple decimal number by actuation of buttons (not shown) at station B. In accordance with this designation, an indication is provided at station B as to information read out of the permanent memory 44 when the station scanning ring counter advances to a position corresponding to station B, after the personnel number has been designated at that station.

It is proposed that each station will provide an indication of stored information relative only to the last identification number that has been designated. It is to be understood, however, that one or more memory monitor panels can be provided as required corresponding to the memory monitor panel 52, which can at all times display an indication relative to each name as to whether or not there is a message for that person and whether or not that person is present in the building. Having thus considered the general organization of the apparatus for one embodiment of the present invention, further detailed consideration will now be given to this apparatus relative to its mode of operation.

OPERATION

Personnel numeral designation and biquinary code storage

To designate a multiple digit personnel number, an operator actuates the decimal number keys for the respective digits of the multiple digit number successively. To set up the number 116, for example, which is registered on the indicator 22 on the console panel 21 in FIG. 1, the operator first designates the one hundreds digit by actuation of the push buton 1. After this button is released, it is actuated a second time to designate the tens digit of the number and after this button is restored to its normal position, the number six button is actuated to designate the unit digit of the number 116.

With reference to FIG. 4A, means is illustrated for encoding the decimal number designations into a biquinary code wherein there is an output on wire 0-1 if the decimal number 0 or 1 has been designated, there is an output on wire 2-3 if either the decimal number 2 or 3 is designated, there is an output on wire 4-5 if either a decimal number 4 or 5 is designated, there is an output on wire 6-7 if either a decimal number 6 or 7 is designated, there is an output on wire 8-9 if either the decimal 8 or 9 has been designated, and there is an output on the wire O-E if the decimal number which has been designated is an even number. The selective energization of the wire O-E, therefore, is a designation corresponding to the binary portion of the biquinary code and the selective energization of one of the other wires is in accordance with the quinary portion of the code. For any decimal number that may be designated, only one of the quinary code wires will be energized because each wire corresponds to a distinctive pair of odd and even decimal numbers, which corresponds to a quinary code in which there is only one "1" character for each code. Thus each of the five wires represents the designation of one of a distinctive pair of odd and even decimal numbers, and the selective energization of the odd-even wire O-E designates whether the decimal number designated is odd or even. These six wires carry the identity of any designated decimal number by a code which can readily be decoded without a complete decoding circuit fan as is required for more conventional codes such as conventional two out of five codes.

A set of six numerical designation biquinary code wires such as those described extends from a control panel 20 or 21 at each of the stations to the central location. This single set of six code wires per station is used for communicating the several digits of the designated multiple digit decimal numbers from each station to the central location in a manner to be more readily apparent as the description progresses.

To consider more specifically how the designation of a decimal number converts the number to a biquinary code, it will be assumed that the push button 1PB is actuated to designate the decimal 1 (see FIG. 4A). Such actuation applies energy through the back contact of that push button to the wire 0-1. Because of this being an odd number, no energy is applied by actuation of button 1PB to the odd-even wire O-E. If an even number, such as the number 6, for example, is designated by the actuation of button 6PB, energy is applied through that push button and through a diode 53 to the code wire 6-7. Also, at the same time, energy is applied through the push button and through a diode 54 to the wire O-E because the energization of this wire is called for in accordance with decimal number designated being an even number. Having thus described how typical odd and even numbers can be encoded into a biquinary code, it should be readily apparent that the other decimal numbers are similarly encoded when corresponding push buttons are actuated.

When one of the biquinary code wires becomes energized at station A, a circuit is closed for the initiation of the station A timer 41 (see FIG. 4B). This circuit includes in series an OR gate 55, an OR gate 56, and wire 57. The initiation of the timer 41 puts a "1" into the stage X2 of digit ring counter 39 over wire 58. The six code wires coming from the personnel numerical designation buttons for station A are applied through suitable inverters 59 as inputs to NOR gates 60 wherein there is a group of NOR gates for each of the digits of the multiple digit numbers being used for personnel identity. More specifically, there are six NOR gates for each digit, and each of these NOR gates has an input code wire coming from its inverter 59 that is normally energized, and a normally energized input wire coming from the digital ring counter for the particular digit stage with which the NOR gates are associated. An output is thus provided for the respective digits of the NOR gates only for wires corresponding to code wires coming from the buttons that are energized, provided that the digital ring counter 39 has selected the associated digit. An output of stage X2 of the digital ring counter 39 disables the second input for the NOR gates belonging to the hundreds digit, and an output is provided for the hundreds digit corresponding to the energization of code wires coming from the control panel.

Upon restoration of the decimal designation push button PB that has been actuated for designation of the hundreds digit, termination of a pulse that has been applied to the OR gate 55 causes generation of a shift pulse for the ring counter 39 by a shift pulse generator 61. This pulse is applied over wire 62 as an input to AND gate 63, the other input of which is provided by the station A timer 41. Output of the AND gate 63 shifts the digit ring counter 39 to the stage for the tens digit, which is stage X1, so that an output of this stage of ring counter 39 is applied to the NOR gates 60, and in accordance with this output, one input to the NOR gates for the tens digit is disabled, and the other input is disabled for the tens NOR gates in accordance with the code input to the NOR gates 60 from the inverter 59. Thus an output is applied over the wires associated with the tens digit from the NOR gates 60. Upon restoration of the push button that has been used to designate the tens digit of the multiple digit decimal number, a second shift pulse is generated by shift pulse generator 61 to cause the shifting of the digit ring counters 39 to that stage X0, and an output from this stage is applied to the NOR gates to disable one input to these gates and thus cause a selected output on wires associated with the units digit from the NOR gates upon designation of the units digit by actuation of one of the decimal push buttons PB.

Code outputs of respective digits of the NOR gates 60 are applied to station A precedence gates 64 (see FIG. 4B). These gates determine that the code first designated for any digit of a number is the code that will be used to govern the station A temporary memory 35. That is, the precedence gates are used to prevent a garbled code in case a push button for a second number is actuated before a first push button is restored to its normal position.

The station A temporary memory 35 has six input wires coming from the station A precedence gates 64 for each digit of the number, and the memory 35 can have a flip-flop circuit, or means for latching a SCR for example, for each of these wires. Such flip-flop is set in response to the energization of the associated input wire. This provides a means for temporarily remembering the biquinary codes for the respective digits of the multiple digit decimal number that has been designated. The station A temporary memory 35 remains in its set position for a predetermined interval timed by the station A timer 41, at the end of which time, the station A temporary memory 35 is reset over wire 65.

When the station A temporary memory 35 is set in accordance with a code input, it provides code outputs to the numerical indicators 23, 24 and 25 belonging to the associated digits. Thus, when the hundreds digit is designated, for example, biquinary code wires in a cable 66 connecting the station A temporary memory with the multiple digit decimal indicators is energized according to the biquinary code so that a code is applied to the hundreds indicator 23 corresponding to the code which has been used to set the hundreds digit portion or the temporary memory 35. The quinary portion of the code comprises the lower five wire input to the hundreds indicator 23, and the binary part of the code characteristic of whether the designation has been odd or even is applied by the two wires connected to the upper portion of the hundreds indicator 23. If the decimal number 1 is stored as a hundreds digit in the temporary memory 35, the hundreds indicator 23 is energized to display a 1 in accordance with energy applied through odd wire 67, one hundreds indicator 23, diode 68, and wire 69 in cable 66. If an 0 is designated as the hundreds digit, the wire 70 is energized because the number is even, and the hundreds indicator is operated to display on 0 indication in accordance with a circuit including energization of wire 70, hundreds indicator 23, diode 71 and wire 69 in the cable 66. A similar means is provided for decoding the biquinary code to manifest, by selective energization of the hundreds indicator 23, any one of the decimal numbers that can be designated for that particular digit of a personnel identity number. Similarly, the tens indicator 24 is controlled in accordance with a biquinary code storage in the station A temporary memory 35, and the units indicator 25 is also controlled in accordance with the portion of the station A temporary memory 35 belonging to the units digit. Each of these indicators becomes energized immediately upon designation of the associated digit and the operator can readily check visually that the number he intended to designate has been properly registered in the station A temporary memory 35. This indication is maintained until the station A timer 41 times out to reset memory 35.

The third number to be designated successively by actuation of the personnel identity buttons corresponds to the units digits, and thus completes the designation of all three digits of a personnel identity number. Registration that the third digit has been designated is provided by the energization of an OR gate 72 that has an output applied to wire 73 provided that a code has been applied as an input to the station A temporary memory 35 for the units digit. Wire 73 applies energy to OR gate 74, the output of which is applied to station A scan request single shot generator 48. The single shot generator 48 applies a pulse to the station scanning ring counter 46, which, when the counter advances to a stage corresponding to station A, stops the clock 47 momentarily to permit an output from the station scan ring counter 46 over wire 76 to AND gates 77. This enables the access switches of permanent memory 44 to be conditioned in accordance with the code belonging to the respective digits of the personnel number stored in the station A temporary memory 35.

INFORMATION MANIFESTATION

The permanent memory 44 stores two types of information remembered relative to each personnel number. One of these types of information is relative to whether or not the person is present at the facility, and the second type of information is whether or not there is a message for the particular person. For manifesting this information, a presence indicator lamp 78 (see FIG. 4A) is provided at each station for illumination in accordance with storage in the permanent memory 44 of information that a particular person having their number designated is present at the facilities. If the person is not present, the lamp 79 may be illuminated when the permanent memory is interrogated by designation of the personnel number belonging to a particular individual. Similarly, a message indicator lamp 80 becomes illuminated upon reading information out of the permanent memory that a particular person whose number has been designated has a message waiting for him, and the energization of an associated indicator lamp 81 indicates that there is no message.

The control of the presence indicator lamp 78 and 79 for station A is in accordance with the condition of a station A presence temporary memory 82 that can be set in accordance with an output of the permanent memory 44 when the permanent memory is interrogated by designation of a particular personnel number at station A. The temporary memory 82, and thus the indication displayed in accordance with that memory, is maintained until the end of a predetermined time interval timed by the station A timer 41.

The station A read enable 49 enables the display of an indication at station A over wire 85 as to the condition of the station A memory 82 characteristic of a presence indication, and the condition of the station A memory 90 characteristic of information as to whether or not there is a message for the person whose number has been designated. The station A read enable 49 remains in its set condition as long as the station A timer 41 is active. This timer times a fixed interval from the last manual actuation of a push button at station A sufficient for an operator to observe an indication of what is read out of the memory 44. The station A timer 41 is automatically restarted each time another button is actuated at station A for designation of information to be read into the permanent memory in a manner to be hereinafter considered. Presence and message information output wires 83 and 84 respectively are common to all stations, but the read temporary memories for the respective stations are subject to control from these wires only during the short interval when a scan request pulse is generated for the associated station. Thus the memories 82 and 90 for station A are conditioned by energization of the output wires 83 and 84 only when wire 76 is energized.

During the time interval for display of information indications at any station, such as at station A, the memories 82 and 90 retain their information that has been read out of the permanent memory 44 unless there is a change in the permanent memory 44 in accordance with a manual designation of different information at station A for the particular personnel identity number stored in the temporary memory 35. Under such conditions, a second station A scan request pulse is generated by the generator 48, which applies a new input to the permanent memory 44, such input being read out of the permanent memory 44 during the scan period assigned to station A to change the read out information in the station A read out memories 82 and 90. At the end of an interval timed by the station A timer, an output is applied over wire 91 to reset the station A read enable 49 and cause the indicator lamps associated with the memories 82 and 90 to be extinguished. At the same time, a reset pulse is applied by the station A timer 41 over wire 65 to reset the station A temporary memory 35, and the resetting of this memory in turn extinguishes the personnel numeral indicators 23, 24 and 25.

INFORMATION DESIGNATION AND STORAGE

After having designated all of the digits of a personnel identity button at a particular station, such as at station A, the information indicator lamps become selectively energized and the operator observes the information indications manifested by the lamps 78, 79, 80 and 81. If the information manifested needs to be changed, a change can be made by the selective actuation of the information designating buttons 26, 27, 28 and 29 (see FIGS. 1 and 4B).

The actuation of the personnel numeral buttons in a manner that has been described is effective to render the station A timer 41 active, and the actuation of an information designating button at that station restarts the station A timer 41 for a new timing cycle, thus maintaining indications on the control panel as to the personnel number that has been designated, and as to information that is read out of the permanent memory 44 for station A. The actuation of a presence designating push button 26 or 27 is effective to restart the station A timer 41 because of energization of a circuit including an OR gate 92, wire 93, OR gate 56, and wire 57. Similarly the actuation of a message push button 28 or 29 is effective through an OR gate 94, wire 95, OR gate 56, and wire 57 to restart the station A timer 41. This provides time for the newly designated controls to be fed into the permanent memory, and for a read out of the permanent memory 44 confirming the designated controls, and also allows additional time for observation of manifested information. The presence indicator lamps 78 and 79 and the message indicator lamps 80 and 81 are selectively illuminated during this timed interval. The presence indication lamps 78 and 79 are preferably contained within the presence designation push button 26 and 27 respectively, and similarly the message indicator lamps 80 and 81 are preferably contained within the message designating push button 28 and 29.

The actuation of an information designating push button 26, 27, 28 or 29 sets a corresponding storage in the M–P command temporary memory 43. Thus the actuation of button 26, for example, to designate that a person is in, sets a corresponding temporary memory element over wire 96. If it is designated that the person is out, energy is applied over wire 97 to set another memory element corresponding to this designation, Similarly the designation that there is a message by the actuation of button 28, applies energy to wire 98 to set a corresponding element in the temporary memory 43, and the actuation of button 29, to designate that there is no message, applies energy over wire 99 to set a corresponding element in the temporary memory 43.

Each time a presence push button 26 or 27 is actuated, energy is applied through OR gate 94, over wire 120, and through OR gate 74 to render the station A scan request generator 48 active to generate a scan request pulse to cause the station scanning ring counter 46 to provide an output over wire 76 to provide for actuation of the access switches in the memory 44 and to enable the information stored in the temporary memory 43 to be transferred to the permanent memory. Read into permanent memory 44 is enabled by energy applied from wire 76 through a delay single shot circuit 121 to the M–P AND gates 50. This energization provides an output of the M–P AND gates 50, selected in accordance with the temporary memory 43, to be applied through suitable M–P drivers 123 to the permanent memory 44. Having thus transferred the information remembered by the temporary memory 43 to the permanent memory 44, the temporary memory 43 becomes reset at the end of the single shot pulse generated by the single shot generator 121. This is accomplished by a differentiator 124 which provides an output on wire 125 to OR gates 126, 127, 128 and 129 in multiple to reset the respective elements of the temporary memory 43.

It is also provided that an operator can change a designation of information during a timing cycle, and thus change the storage in the temporary memory 43. In other words, the actuation of the button 27 to designate that a person is out, when there is already a storage in the temporary memory 43 that the person is in, automatically resets the element corresponding to the in storage through OR gate 127. Similarly, the actuation of any button automatically resets the element corresponding to the button for designation of the opposite information condition.

PERMANENT MEMORY

The permanent memory 44 contains a memory element for remembering information as to presence designation for each personnel number that is used, and also the permanent memory 44 has a memory element for remembering information as to message designation for each personnel number that is used. There are separate access circuit networks for these two types of information memory, both of which networks are used alternately for reading in and reading out of the permanent memory 44.

With reference to FIG. 5B, for this embodiment of the present invention, the memory elements are illustrated as being neon lamps. The message memory lamp 101M, for example, is deenergized to register a condition that there is no message for a person having the personnel identity number 101, and is energized to register that there is a message for a person having this identity number. There is also a neon lamp (not shown) presence memory for the personnel number 101 that is deenergized to indicate that the person is not in the facility, and that is energized to register that the person identified by the number 101 is in. This presence neon lamp corresponds to the lamp 110P which is provided to register the presence or absence of a person having the personnel number 110. Only certain typical message and presence permanent memory storage lamps have been illustrated to simplify the disclosure of the present invention.

Access to the neon memory lamps to either change the information being remembered, or to read out the information remembered, is selected by biquinary relays controlled in turn by the biquinary output code wires of the temporary memories of the respective stations, such as by the output of the station A temporary memory 35 of FIG. 4B through AND gates 77. When the AND gates 77 enable the output of the station A temporary memory 35 to be applied to the access switches of the permanent memory 44, access relays shown in FIGS. 5A and 5B are energized by the biquinary code output wires of the AND gates 77, and the circuit networks for reading in and out of the memory elements are selected by these relays. The code output of the AND gates 77 for the hundreds digit is converted by a suitable converter 130 (see FIG. 5A) from the biquinary code to relays corresponding to discrete hundreds. Thus the hundreds digit is represented by relays 000R, 100R, 200R, 300R, 400R, 500R, 600R, 700R, 800R and 900R. The converter 130 converts the code energization of the even tens wire 131 output of the AND gates 77 and the code energization of the even units wire 132 output of the AND gates 77, each to respective odd and even registrations. Thus a relay 10–OR or 10–ER is energized in accordance with whether the tens digit is odd or even, and a relay 1–OR or 1–ER is energized in accordance with whether the units digit is odd or even.

The five wires belonging to the quinary portion of the output of the station A AND gates 77 for the tens digit control respective access relays, one of these relays being provided for each of the one hundreds digit relays that is required for the personnel numbers that are used. Thus the relay 10–0–1R (see FIG. 5B) is energized through front contact 133 of relay 100R from wire 134, and similarly a tens digit relay is energized for each of the other tens digit quinary code wires. A bank of units digit quinary code relays is provided for each of the hundreds digit relays. Thus a relay 0–1R is energized through front contact 135 of relay 100R from code wire 136, relay 2–3R is energized through front contact 137 of relay 100R code wire 138, relay 4–5R is energized through front contact 139 from code wire 140, relay 6–7R is energized through front contact 141 from wire 142, and relay 8–9R is energized through front contact 143 from code wire 144.

If the personnel number 116 has been designated at station A, as is illustrated by the indicator 22 in FIG. 1, for example, and the station A AND gates 77 have enabled an output from the temporary memory 35, the relays 100R, 10–0–1R, and 6–7R of the access switching relays are picked up to correspond with this code. Because the tens digit is odd, the relay 10–0R is picked up, and because the units digit is even, the relay 1–ER is picked up. With these relays energized, circuits are closed for reading out of memory elements for both message and presence memory in their respective networks. If the neon lamp 116P is in its turned on condition at this time, for example, to register that the person identified by number 116 is present at the facility, an output is provided upon energization of the access relays to a suitable presence detector 145 (see FIG. 5A).

The presence detector 145 has an output only provided that the memory element (neon lamp) to which it is connected is in a state of conduction. If there is an output of the persence detector 145, it is applied to a presence indication bus 84, which is common to all stations, as has been heretofore considered relative to circuits shown in FIG. 4A. Inasmuch as it is being considered that the personnel number 116 has been designated at station A, the application of energy on the presence indication wire 84 causes energization of the indicator lamp 78 on the control panel 21 at station A, because the control of this lamp is enabled at this time by station A enable and drivers 146.

The circuit by which the presence detector 145 is energized under these conditions extends from a suitable source of energy of positive polarity designated as (B+) through lamp 116P (see FIG. 5B), front contact 147 of relay 6–7R, front contact 148 of relay 10–0–1R, wire 149, front contact 150 of relay 10–0R front contact 151 of relay 1ER, back contact 152 of a normally deenergized relay K2, and diode 153. If, at the time the access switches are closed as has been described for the typical example, the lamp 116P is in its non conducting state, to register that the person identified by the number 116 is not present at the facility, there is no energization of the presence detector 145 over the circuit that has been described for this detector, and thus there is no output of the presence detector 145. In accordance with there being no output on the wire 84 at the time when the station A enable and drivers 146 is rendered active, the lamp 79 becomes energized instead of the lamp 78 to register an indication that the person identified by the number 116 is absent from the facility.

A message indicator lamp 80 or 81 is energized at the same time as the presence indication is displayed in accordance with information remembered by a neon lamp (not shown) belonging to the personnel number 116. This indication is provided in a manner similar to that which is illustrated for storage of message information relative to other personnel numbers. To consider a typical circuit for read out of the permanent memory 44 of information remembered relative to whether or not there is a message for particular personnel, it will be assumed that the personnel number designated at station A is the number 109 as is illustrated in the indicator 22 on control panel 20 of FIG. 2. The access relays energized in accordance with the biquinary code of this number are relays 100R, 10–0–1R, 8–9R, 10–ER, and 1–OR. In accordance with the energization of these relays, energy is applied to a message detector 154 if the neon lamp 109M is in its conducting state. The circuit by which an input is provided under these conditions for the message detector 154 includes a source of energy (B+), lamp 109M, front contact 155 of relay 89R, front contact 156 of relay 10–0–1R, wire 157, front contact 158a of relay 10–ER, front contact 158 of relay 1–OR, back contact 159 of a normally deenergized relay K4, and diode 160. The message detector 154 applies an output to wire 83 if there is a message, or applies no output to this wire if there is not a message, and a station that is enabled, such as the station A, has its indicator lamps 80 and 81 selectively controlled during the scan request pulse for that station.

Having thus described in detail the system for reading different types of information out of the permanent memory 44, consideration will now be given as to the manner in which these same circuit networks are used to read information into the permanent memory 44. The general mode of operation for reading information into the permanent memory 44 has been described with reference to FIG. 4B, particularly relative to the remembering of information designated in the temporary memory 43. The temporary memory 43 and enable circuits 50 that have been described relative to FIG. 4B have been represented to FIG. 5A by a station A enable and memory block 161 for convenience in understanding the manner in which the reading into the memory 44 is accomplished. Similar apparatus for station B is represented by a block 162. Outputs of the temporary memories 161 and 162 from station A and station B respectively are applied to buses including wires 163, 164, 165 and 166. The buses 163 and 164 are used for reading message designation into the memory 44, and the wires 165 and 166 are used for reading presence designation into the memory 44. Read in relays K1, K2, K3, and K4 are provided for the respective wires 163, 164, 165 and 166. Relay K2 is energized if a message designation has been made by actuation of push button 28, this relay being energized by an output of the station A enable memory 161 on wire 164. The relay K2 would also be picked up for a corresponding output from station B. If a button is actu- ated at station A, for example, for cancellation of a prior message designation, the wire 163 becomes energized and it causes the picking up of relay K1. Similarly, the relays K3 and K4 are selectively energized in accordance with designations of whether a particular person is out or whether the person is in.

To consider an example of a typical operation in reading information into the permanent memory 44, it will be assumed that a person identified by the number 116 is leaving the facility and wishes to designate that he is leaving by actuation of the push button 27 on the control panel 21 after first having designated his number 116. The temporary memory is conditioned by a mode of operation that has been described, and the station A scan request single shot generator 48 is rendered active to permit the access relays associated with the permanent memory 44 to be controlled in accordance with the number 116 that is assumed to have been designated. The relay K3 becomes energized in accordance with the information control that is assumed to have been designated, and thus a circuit is closed for applying a shunt across the neon memory lamp 116P to extinguish this lamp if it has been in its conducting state. This shunt extends from the power supply terminal (B+) through front contact 152 of relay K3 (see FIG. 5A), front contact 151 of relay 1-ER, front contact 150 of relay 10-OR, wire 149, front contact 148 of relay 10-0-1R, front contact 147 of relay 6-7R, lamp 116P to terminal (B+) of the power supply. This shunt is applied only for the time duration of the scan request pulse generated by the generator 48 (see FIG. 4B), and thus the resetting of the temporary memory 43 of FIG. 4B deenergizes the relay K3, and removes the shunt that has been applied.

To consider another condition of information storage, it will be assumed that the lamp 116P is extinguished and that the person identified by the number 116 is registering into the facility at station A. Such registration causes the picking up of relay K4 (see FIG. 5A), and the picking up of this relay causes the energization of the neon lamp 116P with a potential high enough to turn the lamp on. This energization is provided by a circuit extending from the negative terminal of a power supply as indication by (B—) through resistor 167, front contact 169 of relay K4, front contact 151 of relay 1-ER, front contact 150 of relay 10-OR, wire 149, front contact 148 of relay 10-0-1R, front contact 147 of relay 6-7-R and lamp 116P to the positive terminal of the supply of energy designated as (B+). The lamp 116P when turned on, is maintained energized by a circuit extending from (B+) through the lamp 116P and resistor 175 to ground. The ground connection is considered to be an intermediate tap on the power supply wherein a lower voltage is normally applied to all of the lamps, but this voltage is not sufficient to turn the lamps on, it being sufficient, however, to maintain the lamps in their conducting state until the lamps are shunted for deenergizaion in a manner that has been heretofore considered. It is to be understood that a similar mode of operation is provided for changing the memory for any of the other memory elements in accordance with manual designation at any station and for any personnel number of information to be remembered.

MEMORY MONITOR

In addition to the use of the system as it has been described for interrogating the permanent memory 44 as to information relative to respective designated personnel number, it may be desirable to provide a memory monitor such as the memory monitor 52 shown in FIG. 3 so that, at some particular convenient location, there may be simultaneously displayed indications relative to information remembered by the information memory 44 for each of the personnel using the system. If such a monitor is provided, there will be indicator lamps for the message and presence memory information in the permanent memory 44 of each name. Thus a presence indicator lamp 170 and a message indicator lamp 171 is provided for the first name, and similar lamps are provided for the other names on a panel of the memory monitor 52. These indicator lamps may be used, for example, to illuminate the associated name plate if such name plate is constructed of translucent material or the information can be displayed in any other suitable manner in accordance with the requirements of practice.

A typical system for the selective energization of indicator lamps on the panel of the memory monitor 52 is illustrated for the control of the presence indicator lamp 170 in FIG. 5B. The indicator lamp 170 of FIG. 5B is illustrated as being controlled through a transistor Q3 which is associated with memory neon lamp 118P. A transistor Q1 is switched on by current flow through resistors 172 and 173 in series with lamp 118P when lamp 118P is turned on. In turn, transistor Q2 is cut off by removal of voltage source, which allows transistor Q3 to saturate through resistor 178. The presence indicator lamp 170 is energized through the collector-emitter circuit of the transistor Q3. It is to be understood that the detailed circuits for the energization of the monitor lamp 170 is shown as typical of the manner in which other monitor lamps on the panel of the monitor 52 can be controlled.

Having thus described one embodiment of a personnel information register system, it is desired to be understood that this form is selected to facilitate the disclosure of the invention rather than to limit the number of forms the invention can assume. While the invention has been described in its preferred embodiment it is to be understood that words which have been used are words of description rather than of limitation, and that changes within the purview of the appending claims can be made without departing from the true spirit and scope of the invention in its proper aspects.

What we claim is:

1. A personnel information register system having a plurality of remotely spaced stations relative to a central location wheerin distinctive multiple digit decimal numbers are assigned respectively to a large number of persons comprising,
    (a) numerical designating means at each of the stations for designating the digits successively of each of the multiple digit personnel numbers,
    (b) temporary personnel number memory means for each station responsive to the numerical designating means for that station for remembering all digits of the number designated for a predetermined time interval,
    (c) manually operable information designating means at each of the stations, for designating information relative to a person whose number has last been designated by the numerical designating means for that station,
    (d) permanent memory means common to all stations for remembering the information designated by said information designating means at any station pertinent to a personnel number,
    (e) control means governed jointly by the number memory means and the information designating means for each station for at times reading information out of the permanent memory for a designated number at the associated station and at other times for changing the information stored in the permanent memory for a designated number at the associated station, and
    (f) means for enabling the control means only in response to designation successively of all digits of a multiple digit personnel number by the numerical designating means.

2. The invention according to claim 1 wherein normally active scanning means is provided having a stage for each of the stations for successively affording the respective stations access to the permanent memory at different times, the scanning means being normally operable to scan the stations at a rapid rate.

3. The invention according to claim 2 wherein means is provided responsive to the designation of the last of the digits of a multiple digit number by the numerical designating means at each station for momentarily stalling the scanning means for a short interval when it reaches its stage belonging to that station to provide a time interval for read out from the permanent memory.

4. The invention according to claim 2 wherein read out temporary memory means is provided for each station for storing read out from the permanent memory, and means is provided at each station for manifesting information contained in the read out temporary memory means for that station for a predetermined relatively long time interval after it has been set, whereby information relative to different persons can be requested and contemporaneously manifested at the several stations.

5. A personnel information register system having at least one station remotely spaced relative to a central location wherein distinctive multiple digit decimal numbers are assigned respectively to a large number of persons comprising,
  (a) decimal number manual designating means at the station having a key for each different decimal number for manually designating the respective digits of the several multiple digit decimal numbers,
  (b) encoding means at the station for encoding each decimal digit designated into a biquinary code wherein only one of five code wires is selected for energization in accordance with whether the number designated is one or the other of five pairs of different decimal numbers, one number of each pair being an odd number and one number of each pair being an even number and wherein the sixth wire is selectively energized or deenergized in accordance with whether the decimal number designated is odd or even,
  (c) means at the station for manually designating information pertinent to any person whose number has been designated,
  (d) memory means at the central location operable when enabled to store the information designated by the information designating means, and
  (e) access switching means at the central location controlled in accordance with energization of the code wires in response to a designated multiple digit personnel number for enabling the memory means to store the information designated by the information designating means.

6. The invention according to claim 5 wherein means is provided for enabling the memory means only provided that all of the digits of a multiple digit personnel number have been designated.

7. The invention according to claim 5 wherein read out means is provided for manifesting information stored by the memory means belonging to the respective personnel numbers.

8. The system according to claim 7 wherein timing means is provided for each station for governing the duration of a cycle and means is provided for maintaining the information read out manifestation until the end of the cycle.

9. The invention according to claim 8 wherein the timing means comprises a normally inactive timer that is set to time a predetermined interval after being started for determining the end of the cycle, and wherein timer control means is provided to start the timer in response to the actuation of the manual number designating means and to extend the timer in response to the information designating means for the associated station.

10. The invention according to claim 5 wherein the number designating means, the encoding means and the manual information designating means are provided for each of a plurality of stations remotely spaced from the central location, and scanning means is provided having a stage for each station for scanning the stations to control the access switching means at the central location from the code wires at the respective stations successively, one station at a time.

11. The invention according to claim 10 wherein means is provided at the central location for sensing when the manual number designating means has been actuated for a particular station and control means for generating a scan request pulse for stalling the scanning means for a predetermined time interval when it reaches a stage corresponding to a station for which the sensing means has detected actuation of the designating means to allow time for actuation of the access switching means.

12. The invention according to claim 11 wherein read out of the memory is rendered effective for any station only when said scan request pulse is generated for that station.

References Cited

UNITED STATES PATENTS

| | | | |
|---|---|---|---|
| 2,740,106 | 3/1956 | Phelps | 340—147 |
| 2,910,238 | 10/1959 | Miles et al. | 235—167 |
| 3,063,036 | 11/1962 | Reach et al. | 340—172.5 |
| 3,134,016 | 5/1964 | Connolly et al. | 235—152 |
| 3,241,117 | 3/1966 | Schottle et al. | 340—153 |
| 3,296,597 | 1/1967 | Scantlin et al. | 340—172.5 |
| 3,312,952 | 4/1967 | Scantlin et al. | 340—172.5 |
| 3,344,401 | 9/1967 | MacDonald et al. | 340—172.5 |

PAUL J. HENON, Primary Examiner

R. F. CHAPURAN, Assistant Examiner

U.S. Cl. X.R.

340—172.5